United States Patent [19]

Fukunaga et al.

[11] Patent Number: 4,967,360
[45] Date of Patent: Oct. 30, 1990

[54] ACTIVELY CONTROLLED SUSPENSION SYSTEM WITH POWER SUPPLY CONTROL

[75] Inventors: Yukio Fukunaga; Naoto Fukushima; Yohsuke Akatsu; Sunao Hano; Masaharu Sato, all of Kanagawa, Japan

[73] Assignee: Nissan Motor Company, Limited, Yokohama, Japan

[21] Appl. No.: 266,763

[22] Filed: Nov. 3, 1988

[30] Foreign Application Priority Data

Nov. 5, 1987 [JP] Japan .................................. 62-280071

[51] Int. Cl.⁵ ............................................ B60G 17/015
[52] U.S. Cl. .................... 364/424.05; 280/707
[58] Field of Search ............... 364/424.05; 280/707, 280/709, 708

[56] References Cited

U.S. PATENT DOCUMENTS

| | | | |
|---|---|---|---|
| 3,734,478 | 5/1973 | Lohr | 267/34 |
| 3,922,000 | 11/1975 | Pruvot et al. | 280/124 |
| 4,579,366 | 4/1986 | Doi et al. | 280/707 |
| 4,693,494 | 9/1987 | Buma et al. | 364/424.05 |
| 4,729,580 | 3/1988 | Buma et al. | 364/424.05 |
| 4,743,000 | 5/1988 | Karnopp | 267/218 |
| 4,770,438 | 9/1988 | Sugasawa et al. | 364/424.05 |
| 4,789,935 | 12/1988 | Buma et al. | 364/424.05 |
| 4,801,155 | 1/1989 | Fukushima et al. | 280/707 |
| 4,805,102 | 2/1989 | Ise et al. | 364/426.02 |
| 4,827,416 | 5/1989 | Kawagoe et al. | 364/424.05 |
| 4,848,790 | 7/1989 | Fukunaga et al. | 280/707 |
| 4,865,348 | 9/1989 | Hano et al. | 280/707 |
| 4,888,696 | 12/1989 | Akatsu et al. | 364/424.05 |

FOREIGN PATENT DOCUMENTS

| | | |
|---|---|---|
| 159833 | 10/1985 | European Pat. Off. . |
| 184758 | 6/1986 | European Pat. Off. . |
| 283004 | 9/1988 | European Pat. Off. . |
| 60-191809 | 9/1985 | Japan . |
| 1205148 | 9/1970 | United Kingdom . |

OTHER PUBLICATIONS

B. K. Chance, "1984 Continental Mark VII/Lincoln Continental Electronically-Controlled Air Suspension (EAS) System", Ford Motor Company, Society of Automotive Engineers, Inc., 1985, pp. 2.741-2.753.

Primary Examiner—Parshotam S. Lall
Assistant Examiner—V. N. Trans
Attorney, Agent, or Firm—Foley, Lardner, Schwartz, Jeffery, Schwaab, Mack, Blumenthal & Evans

[57] ABSTRACT

An actively controlled suspension system introduces two-way mode operation in controlling suspension. A suspension control system operates in a normal mode for controlling fluid pressure in a hydraulic cylinder disposed between a vehicle body and a suspension member is adjusted depending upon the vehicle driving conditions in order to suppress vehicular attitude change, and a power OFF transition mode for controlling the fluid pressure toward a preset neutral pressure. The hydraulic circuit is constructed to maintain the pressure in the working chamber of the hydraulic cylinder at the neutral pressure while power is not supplied to control system.

15 Claims, 5 Drawing Sheets

ACTIVELY CONTROLLED SUSPENSION SYSTEM WITH POWER SUPPLY CONTROL

BACKGROUND OF THE INVENTION

1. Field of the Invention

The present invention relates generally to an actively controlled suspension system for controlling suspension characteristics depending upon the vehicle driving condition. More specifically, the invention relates to a power supply control system for an actively controlled suspension system in which suspension control is maintained active after turning OFF of a main power switch, i.e. an ignition switch.

2. Description of the Background Art

Actively controlled suspension systems have gained popularity in automotive vehicles because of remarkable performance in achieving both driving stability and riding comfort. Such suspension systems perform various controls, such as anti-rolling and/or anti-pitching control, bounding suppressive control and so forth, for regulating vehicular body attitude at various vehicle driving mode conditions.

In general, bouncing suppressive suspension control is performed for suppressing relative displacement between a vehicle body and a suspension member which rotatable supports a road wheel. Relative displacement between the vehicle body and a suspension member is monitored by means of sensors, such as a vertical acceleration sensor, a stroke sensor and so forth.

In practice, suspension control is performed by regulating a vehicular height at a predetermined height level for suppressing vehicular attitude change. Therefore, vehicular height level is maintained at the predetermined height level as long as the suspension control is active. However, when an ignition switch is turned OFF, the fluid pressure in the working chamber is rapidly drained to the pressure source unit, in which fluid pressure is droped to zero in response to termination of engine driving. As a result, unintended vehicular height variation occurs in response to turning OFF of the ignition switch. This clearly reduces riding comfort.

SUMMARY OF THE INVENTION

Therefore, it is an object of the present invention to provide an actively controlled suspension system, which can prevent the vehicular height from changing in response to turning OFF of an ignition switch.

Another object of the invention is to provide a suspension control system, in which a pressure in a working chamber of a hydraulic cylinder disposed between a vehicular body and a suspension member, is maintained at a preset neutral pressure while power is not supplied to a control unit.

In order to accomplish the aforementioned and other objects, an actively controlled suspension system, according to the present invention, introduces a two-way mode operation in controlling suspension. A suspension control system operates in a normal mode for controlling fluid pressure in a hydraulic cylinder disposed between a vehicle body and a suspension member is adjusted depending upon the vehicle driving condition in order to suppress vehicular attitude change, and a power OFF transition mode for controlling the fluid pressure toward a preset neutral pressure.

In the preferred construction, the hydraulic circuit is constructed to maintain the pressure in the working chamber of the hydraulic cylinder at the neutral pressure while power is not supplied to the control system.

According to one aspect of the invention, a control system for controlling suspension characteristics in an automotive suspension system, comprises:

a cylinder disposed between a vehicle body and a suspension member which rotatably supports a road wheel, the cylinder defining a variable pressure working chamber filled with a pressure medium for generating a damping force resisting against relative displacement between the vehicle body and the suspension member;

a pressure source circuit means connected to the working chamber for supplying pressure medium and including a pressure source feeding pressurized pressure medium through the circuit;

a pressure control valve disposed between the pressure source and the working chamber and variable of valve position between a first mode for increasing pressure of the pressure medium within the working chamber, a second mode for decreasing pressure in the pressure medium within the working chamber, and a third mode for maintaining the pressure in the pressure medium within the working chamber constant;

a sensor means for monitoring vehicle body attitude change for producing a vehicle body attitude change indicative sensor signal;

a controller means for deriving a control signal on the basis of the vehicle body change indicative signal for operating the pressure control valve to one of the first, second and third mode to adjust the pressure of the pressure medium in the working chamber for suppressing attitude change of the vehicle body;

an electric power supply circuit connecting the controller means to an electric power source, the electric power supply circuit including a power main switch for controlling power supply for the controller means; and means, responsive to switching of the power main switch from a power supply position to power shut-off position, for maintaining power supply for the controlling means for a given period of time.

According to another aspect of the invention, a control system for controlling suspension characteristics in an automotive suspension system, comprises:

a cylinder disposed between a vehicle body and a suspension member which rotatably supports a road wheel, the cylinder defining a variable pressure working chamber filled with a pressure medium for generating a damping force resisting against relative displacement between the vehicle body and the suspension member;

a pressure source circuit means connected to the working chamber via a control line for supplying pressure medium and including a pressure source feeding pressurized pressure medium through the circuit;

a pressure control valve connected to the pressure source via a supply line and a drain line and to the working chamber via the control line and variable of valve position between a first mode for increasing pressure of the pressure medium within the working chamber, a second mode for decreasing pressure in the pressure medium within the working chamber, and a third mode for maintaining the pressure in the pressure medium within the working chamber constant;

first and second check valve means respectively provided in the supply and drain lines, the first check valve means allowing flow of pressure medium from the pressure source to the pressure control valve and the second check valve means allowing flow of the pressure medium from the pressure control valve to the pressure source, and the second check valve means being responsive to a pressure of pressure medium in the drain line equal to a predetermined pressure for blocking fluid communication therethrough; a sensor means for monitoring vehicle body attitude change for producing a vehicle body attitude change indicative sensor signal;

a controller means for deriving a control signal on the basis of the vehicle body attitude change indicative signal for operating the pressure control valve to one of the first, second and third mode to adjust the pressure of the pressure medium in the working chamber for suppressing attitude change of the vehicle body;

an electric power supply circuit connecting the controller means to an electric power source, the electric power supply circuit including a power main switch for controlling power supply for the controller means; and means, responsive to switching of the power main switch from a power supply position to power shut-off position, for maintaining power supply for the controlling means for a given period of time.

The power main switch may be an ignition switch. The controller means may be variable of operation mode between a normal mode for deriving the control signal on the basis of the vehicular attitude indicative signal value for suppressing vehicular attitude change and a power OFF transition mode, in which pressure of the pressure medium is adjusted toward a preset pressure. The controller means may derive the control signal in the power OFF transisition mode for gradually adjusting the pressure of the pressure medium in the working chamber toward a preset pressure. The controller means may derive the control signal in the power OFF transisition mode for adjusting the pressure of the pressure medium in the working chamber in stepwise fashion toward the preset pressure.

DESCRIPTION OF THE PREFERRED EMBODIMENT

Figure 1:
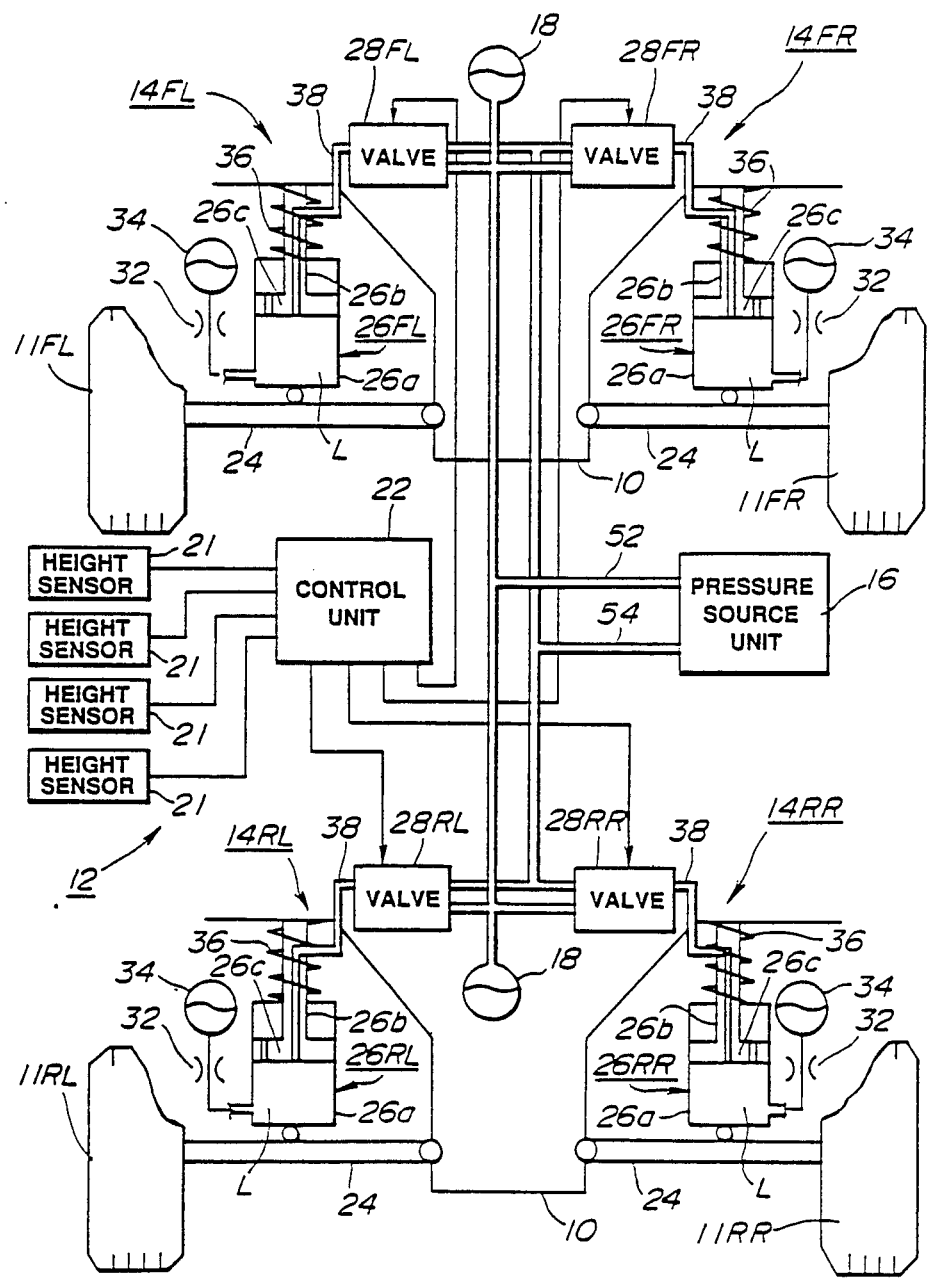
FIG. 1 is an illustration of the overall construction of the preferred embodiment of an actively controlled suspension system according to the present invention, in which the preferred process of fail-detection and fail-safe operation is to be implemented.

Referring now to the drawings, particularly to FIG. 1, the preferred embodiment of an actively controlled suspension system, according to the present invention, is designed to generally perform suspension control for suppressing relative displacement between a vehicle body 10 and suspension members 24FL, 24FR, 24RL and 24RR provided in front-left, front-right, rear-left and rear-right suspension mechanisms 14FL, 14FR, 14RL and 14RR and rotatably supporting front-left, front-right, rear-left and rear-right wheels 11FL, 11FR, 11RL and 11RR, which suspension member will be represented by the reference numeral "24" as generally referred to, and suspension mechanisms will be represented by the reference numeral "14" as generally referred to, and whereby suppressing vehicle body attitude change. Respective front-left, front-right, rear-left and rear-right suspension mechanisms 14FL, 14FR, 14RL and 14RR include hydraulic cylinders 26FL, 26FR, 26RL and 26RR, which hydraulic cylinder will be hereafter represented by the reference numeral "26" as generally referred to.

Each of the hydraulic cylinder 26 is disposed between the vehicle body 10 and the suspension member 24 to produce a damping force for suppressing relative displacement between the vehicle body and the suspension member. The hydraulic cylinder 26 has a cylinder body 26a. The cylinder body 26a defines a working fluid chamber therein. A piston 26c is disposed within the working fluid chamber to divide the working fluid chamber into a lower working chamber 26d and an upper reference pressure chamber 26e. As will be seen from FIG. 1, the working chamber 26d and the reference pressure chamber 26e communicate with each other via an orifice 26f defined through the piston 26c. The piston 26c is connected to the vehicle body 10 via a piston rod 26b. A suspension coil spring 36 is wound around the piston road 26b.

The working chamber 26d of each hydraulic cylinder 26 is connected to a hydraulic pressure source unit 16 via a pressure supply line 52, a pressure drain line 54, a pressure control valve units 28FL, 28FR, 28RL and 28RR and a pressure control line 38, which pressure control valve units will be hereafter represented by the reference numeral "28" as generally referred to, and a pressure line 38. As seen from FIGS. 1 through 3, the pressure line 38 is connected to a fluid path 26g defined through the piston rod 26b and the piston 26c. The working chamber 26d of the hydraulic cylinder 26 is further communicated with a pressure accumulator 34 via an orifice 32. Another pressure accumulator 18 is provided in the pressure supply line 52 for accumulating the excessive pressure generated by the pressure source unit 16.

The pressure control valve unit 28 comprises a proportioning valve and is designed to be controlled by an electric control signal for varying the valve position according to a variation of a current value of the control signal. Generally, the pressure control valve unit 28 controls the magnitude of introduction and draining of the pressurized working fluid into and from the working chamber 26d for adjusting the pressure in the working chamber for setting the damping mode of the hydraulic cylinder 26. To control the valve position of the pressure control valve unit 28, a control unit 22 which comprises a microprocessor, is provided.

The control unit 22 is connected to various sensors which monitor vehicle body attitude change representative parameters to produce sensor signals. The sensors may include a vehicular height sensor 21 for monitoring the stroke of relative motion between the vehicle body and the suspension member 24 to produce a vehicle height indicative sensor signal. While the shown embodiment employs the vehicle height sensor as the vehicular attitude change indicative paramter, a similar vehicular height indicative parameter can be monitored by a vertical acceleration sensor which monitors vertical accelerations exerted to the vehicle body to produce a vertical acceleration indicative signal for bouncing control for suppressing bounding and rebounding motion of the vehicle body. In addition, a longitudinal acceleration sensor for monitoring longitudinal acceleration exerted on the vehicle body as a vehicular pitching representative parameter, and a lateral acceleration sensor for monitoring lateral acceleration exerted on the vehicle body as a vehicular rolling representative parameter may be employed for anti-pitching and anti-rolling control. Furthermore, other sensors, such as a vehicular speed sensor, a steering angle sensor and so forth which monitor vehicular driving condition affecting vehicular attitude may also be employed for performing various suspension controls.

Figure 2:
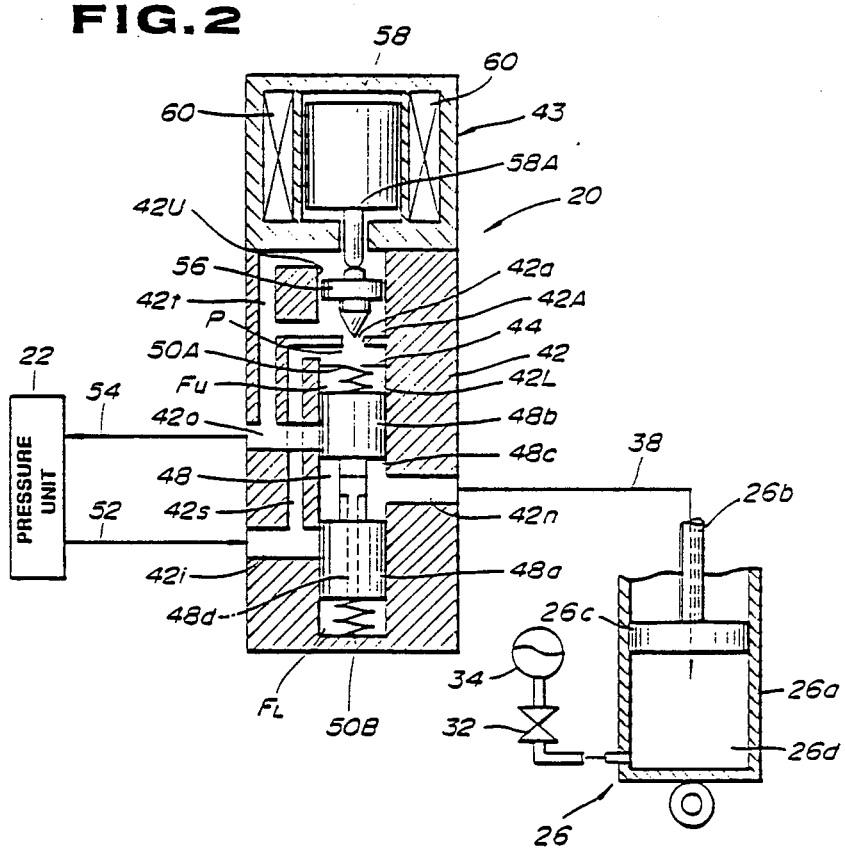
FIG. 2 is a sectional view of a pressure control valve employed in the preferred embodiment of the actively controlled suspension system of FIG. 1.

FIG. 2 shows the detailed construction of the pressure control valve unit 28 to be employed in the shown embodiment of the actively controlled suspension system set forth above.

The pressure control valve 28 comprises a valve housing 42 which houses a proportioning solenoid 43. The proportioning solenoid 43 is electrically connected to the control unit 22. The valve housing 42 defines a valve bore which is separated into a valve chamber 42L and a control chamber 42U by means of a partitioning member 42A. The partitioning member 42A is formed with a communication hole 42a. Above the communication hole 42a is defined above the control chamber 42U. The valve chamber 42L and the control chamber 42U are aligned to each other across the communication hole 42a. Beneath the communication hole 42a and adjacent the top of the valve chamber 42L, a stationary throttling orifice defining member 44 is provided. The throttling orifice defining member 44 is formed with an orifice of fixed throttling rate. The throttling orifice defining member 44 defines along with the partitioning member 42A a pilot chamber P.

A valve spool 48 is thrustingly or slidingly disposed within the valve chamber 42L. The valve spool 48 defines an upper feedback chamber FU between the top end thereof and the throttling orifice defining member 44. The valve spool 48 also defines a lower feedback chamber FL between the lower end thereof and the bottom of the valve chamber 42L. Offset springs 50A and 50B are disposed within the upper and lower feedback chambers FU and FL, which offset springs exert spring forces to the valve spool 48 for resiliently restricting movement of the latter. The valve chamber 42L is communicated with an inlet port 42i, a drain port 42o and a communication port 42n which are defined through the valve housing 42. The inlet port 42i is connected to the pressure unit 16 via a supply line 52. On the other hand, the drain port 42o is connected to the pressure unit 16 via the drain line 54.

The valve spool 48 is formed with an upper land 48b and a lower land 48a. The upper and lower lands 48b and 48a define therebetween an annular pressure chamber 48c. The valve spool 48 is formed with a pilot path communicating the pressure chamber 48c with the lower feedback chamber FL.

A poppet valve member 56 is disposed within the control chamber 42U for thrusting or sliding movement therein. The poppet valve member 56 has a valve head facing the communication hole 42a. The poppet valve member 56 is operably associated with the proportioning solenoid 43 which comprises a plunger 58 which has a plunger rod 58A. The lower end of the plunger rod 58A of the plunger 58 faces the top end of the poppet valve 56. The poppet valve member 56 is driven by the plunger 58 to control the path area in the communication hole 42a according to the position of the plunger rod 58A. Therefore, the poppet valve member 56 adjusts the path area of the communication hole 42a to thereby control fluid pressure to be introduced in the pilot chamber P. Poppet valve member 56 separates the control chamber 42U into upper and lower control chambers. In order to control the position of the poppet valve 56 for adjusting the pilot pressure in the pilot chamber P, a solenoid coil 60 is provided for causing axial shift of the plunger rod 58A when energized.

By adjusting the fluid pressure in the pilot chamber P, the pressure in the upper feedback chamber FU is adjusted to exert an axial driving force to the valve spool 48 to shift it axially. By this, selective fluid communication between the inlet port 42i, the drain port 42o, and the communication port 42n can be established to adjust the fluid pressure at the communication port 42n. Since the pressure at the communication port 42n is equal to the fluid pressure in the woking chamber 26d of the pressure cylinder 26, the damping force created by the pressure cylinder can be adjusted. The inlet port 42i is also connected to the pilot chamber P via a fluid path 42s. On the other hand, the drain port 42o is connected to control chamber 42U via a fluid path 42t.

In order to control the pressure at the communication port 42n, a control current I is applied to the solenoid coil 60.

Figure 3:
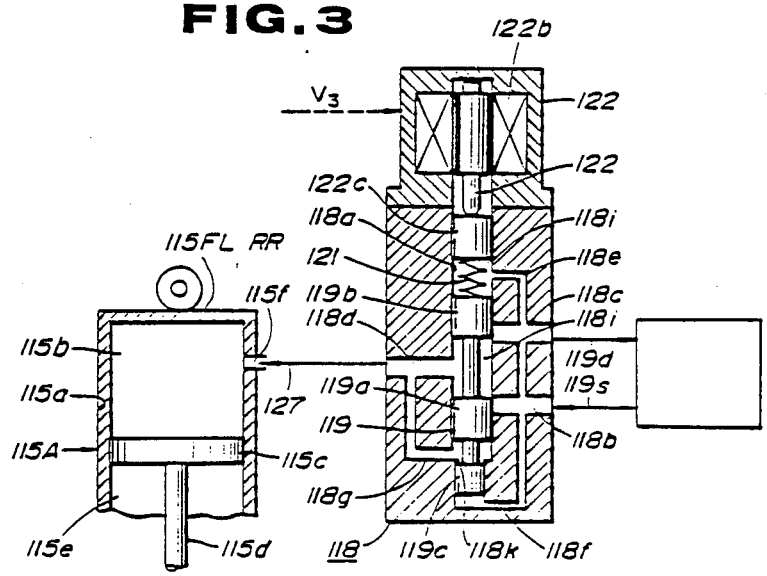
FIG. 3 is another embodiment of the pressure control valve to be employed in the preferred embodiment of the actively controlled suspension system of FIG. 1

FIG. 3 shows alternative embodiment of the pressure control valve unit 28 to be employed in the preferred embodiment of the actively controlled suspension system, according to the invention.

FIG. 3 shows the detailed construction of the hydraulic cylinder 115A and the pressure control valve 22. As will be seen from FIG. 3, the hollow cylinder housing 115a is formed with a port 115f communicating the upper fluid chamber 15d to an outlet port 118d of the pressure control valve 22 via a communication line 127. Though not clearly FIG. 3, shown in the lower fluid chamber 115e is defined as an enclosed space and is filled with the viscous working fluid. The pressure of the working fluid in the lower fluid chamber 115e at an initial position of the piston 115c serves as a reference pressure and per se serves as resistance for downward movement of the piston.

The pressure control valve 22 has a valve housing 18A having the aforementioned outlet port 118d, an inlet port 118b and a drain port 118c. The inlet port 118b, the drain port 118c and the outlet port 118d are all connected to a valve bore 118a defined within the valve housing 118A. A valve spool 119 is disposed within the valve bore 118a for thrusting movement therein. The valve spool 119 has first, second and third lands 119a, 119b and 119c. As will be seen from FIG. 3, the third land 119c has a smaller diameter than that of the first and second lands 119a and 119b. The third land 119c defines a fifth pressure control chamber 118h which is connected to the drain port 118c via a drain path 118f. An actuator piston 122c is also disposed within the valve bore 118a. The actuator piston 122c opposes the second land 119b in spaced apart relationship to define a second pressure control chamber 118i which is connected to the drain port 118c via a drain path 118e. An annular pressure chamber 118j is defined between the first and second lands 119a and 119b. The pressure chamber 118j is constantly communicated with the outlet port 118d and with the upper fluid chamber 115d. On the other hand, the pressure chamber 118j shifts with the shifting of the valve spool 119 to selectively communicate with the inlet port 118b and the drain port 118c. On the other hand, a pressure control chamber 118k is defined between the first and third lands 119a and 119c. The pressure control chamber 118k is in communication with the outlet port 118d via a pilot path 118g. A bias spring 122d is interposed between the actuator piston 122c and the valve spool 119. The actuator piston 122c contacts with an actuator rod 122a of an electrically operable actuator 122 which comprises an electromagnetic solenoid. The solenoid 122 comprises a proportioning solenoid.

In order to increase the supply pressure of the working fluid, the spool valve 119 is shifted to the position to increase path area at a throttle constituted at the inner end of the inlet port 118b by means of the land 119a of the spool valve 119. On the other hand, in order to decrease the supply pressure of the working fluid, the spool valve is shifted to the position to decrease the path area at the throttle of the inner end of the inlet port 118b and opens the drain port 118 which is normally blocked by means of the land 119b of the spool valve.

As seen from FIG. 3, the proportioning solenoid 122 comprises the actuator rod 122a and a solenoid coil 122b. The solenoid coil 122b is energized by suspension control signal from the control unit. In the shown embodiment of the pressure control valve, the working fluid pressure P at the outlet port 118d is variable according to the predetermined variation characteristics. Namely, when the control value represented by the suspension control signal is zero, the pressure at the outlet port 118 becomes an initial pressure determined according to a predetermined offset pressure. When the suspension control signal value in positive value increases, the fluid pressure at the outlet port 118d increases with a predetermined proportioning rate. Namely, by increasing the suspension control value, the actuator rod 122a is driven downwardly in FIG. 3 to a position to achieve increasing an increase of the fluid pressure with the predetermined proportioning rate. The fluid pressure at the outlet port 118d equalizes at the output pressure of the pressure unit. On the other hand, when the suspension control signal value decreases, the pressure decreases to zero by shifting the actuator rod 122a.

The actuator rod 122a of the proportioning solenoid 122 is associated with the actuator piston 122c. Contact between the actuator rod 122a and the actuator piston 122c can be maintained by the resilient force of the bias spring 121 which normally biases the actuator piston toward the actuation rod. On the other hand, the spring force of the bias spring 121 is also exerted on the valve spool 119 to constantly bias the valve spool downwardly in FIG. 3. The valve spool 119 also receives upward hydraulic force from the pressure control chamber 118k. Therefore, the valve spool 119 is oriented at the position in the valve bore at the position where the downward bias of the bias spring 121 balances with the upward hydraulic force of the pressure control chamber 118k.

Figure 4:
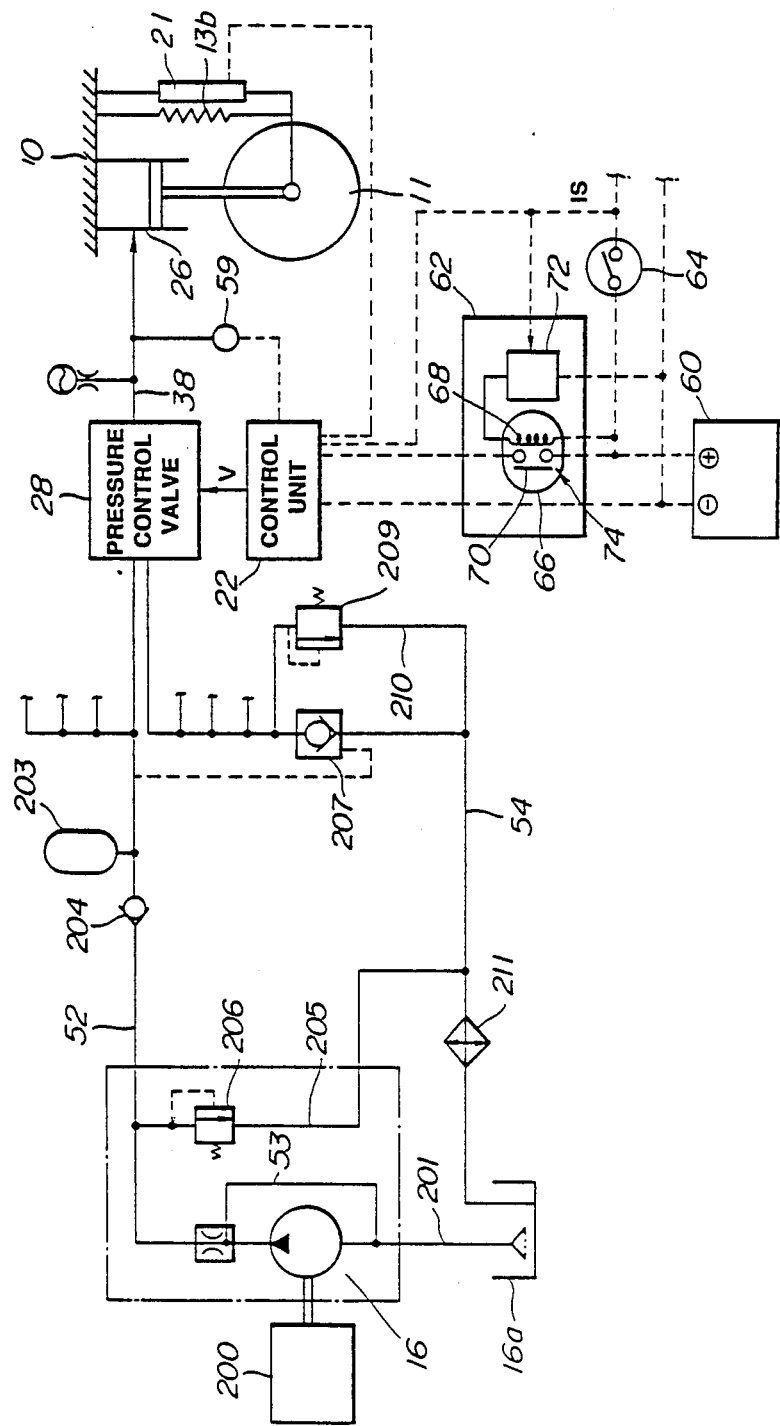
FIG. 4 is a circuit diagram of a hydraulic circuit to be employed in the preferred embodiment of the actively controlled suspension system according to the present invention.

FIG. 4 is a circuit diagram of a hydraulic circuit including the pressure source unit 16 and the working fluid chamber 26d of the hydraulic cylinder 26.

FIG. 4 shows a detailed circuit construction of the preferred embodiment of the hydraulic system to be employed in the suspension control system according to the invention. As set forth, the pressure source unit includes the pressure unit 16 which comprises a fluid pump, and is connected to the reservoir 16a via a suction pipe 201 which is driven by means of an automotive engine 200. The outlet of the pressure unit 16, through which the pressurized working fluid is fed, is connected to the inlet port 42i of the pressure control valve 18 via the supply line 52. A pressure regulating orifice 202 is disposed in the supply line 52 for suppressing pulsatile flow of the working fluid to regulate the output pressure of the pressure unit 16 to be delivered to the pressure control valve 28. A feedback line 53 is connected upstream of the pressure regulating orifice 202 at one end. The other end of the feedback line 53 is connected upstream of the inlet of the pressure unit 16. Therefore, excessive fluid between the pressure unit 16 and the orifice 202 is fed back to the inlet side of the pressure unit.

A pressure accumulator 203 is also connected to the supply line 52 to receive therefrom the pressurized fluid for accumulating the pressure. A one-way check valve 204 is disposed in the supply line 52 at a position upstream of the junction between the pressure accumulator 203 and the supply line 52.

A pressure relief line 205 is also connected to the supply line 52 at a position intermediate the pressure regulating orifice 202 and the one-way check valve 204, at one end. The other end of the pressure relief line 205 is connected to the drain line 54. A pressure relief valve 206 is disposed in the pressure relief line 205. The pressure relief valve 206 is responsive to fluid pressure in the supply line 52 higher than a given value to drain part of the working fluid to the drain line for maintaining the pressure in the supply line 52 below the given pressure value.

A shut-off valve 207 is disposed in the drain line 54. The shut-off valve 207 is also connected to the supply line 52 upstream of the one-way check valve 204 to receive therefrom the pressure in the supply line as a pilot pressure, via pilot line 208. The shut-off valve 207 is designed to be maintained open as long as the pilot pressure to be introduced through the pilot line 208 is held at a pressure level higher than or equal to a given pressure level. At the open position, the shut-off valve maintains fluid communication between the inlet side and outlet side thereof so that the working fluid in the drain line 54 may flow therethrough to the reservoir tank 16a. On the other hand, the shut-off valve 207 is responsive to a pilot pressure drop below the given pressure level to be switched into a shut-off position. At the shut-off position, the shut-off valve blocks fluid communication between the drain port 42o and the reservoir tank 16a.

A pressure relief valve 209 is provided in parallel with the shut-off valve 207. The pressure relief valve 209 is disposed in a by-pass line 210 connecting the upstream side and downstream side of the shut-off valve 207. The pressure relief valve 209 is normally held at closed position to block fluid communication therethrough. On the other hand, the pressure relief valve 209 is responsive to a fluid pressure in the drain line 54 upstream thereof, higher than a set pressure, e.g. 30 kgf/cm², in order to establish fluid communication between the upstream side and downstream side of the shut-off valve to allow the excessive pressure at the upstream side drain line 54 to be drained therethrough. Therefore, the pressure relief valve 209 limits the maximum pressure at the set pressure. The set pressure of the pressure relief valve 209 corresponds to a predetermined offset pressure.

An oil cooler 211 is disposed in the drain line 54 for cooling the working fluid returning to the reservoir tank 16a.

Pressurized fluid supply operation performed by the pressure source unit as set forth above will be discussed herebelow.

While the automotive engine 200 is running, the fluid pump, and thus the pressure unit 16, is driven. Therefore, the working fluid in the reservoir tank 16a is drawn via the suction pipe 201 and pressurized through the pressure unit 16. The pressurized working fluid is discharged from the outlet of the pressure unit 16 and fed to the pressure control valve 28 via the supply line 54 including the pressure regulating orifice 202 and the one-way check valve 204. When the pressure control valve 28 is in the position shown in FIG. 2, the pressurized working fluid passes the pressure control valve and is introduced into the working chamber 26d of the hydraulic cylinder 26. On the other hand, when the pressure control valve 28 is shifted to block communication between the supply line 52 and the working chamber 26d, the line pressure in the supply increases. When the line pressure in the supply line 52 becomes higher than a set pressure of the pressure relief valve 206 in the pressure relief line 205, the excessive pressure higher than the set pressure is fed to the drain line 54 via the pressure relief valve 206 and thus is returned to the reservoir tank 16a.

The fluid pressure in the supply line 52 is also fed to the shut-off valve 207 via the pilot line 208. As set forth, the shut-off valve 207 is placed at an open position as long as the pilot pressure introduced through the pilot line 208 is held higher than or equal to the set pressure thereof. Therefore, fluid communication between the pressure control valve 28 and the reservoir tank 16a is maintained. At this position, the working fluid is thus returned to the reservoir tank 16a via the drain line 54 via the shut-off valve 207 and the oil cooler 211.

Since the shut-off valve 207, even at the open position, serves as a resistance to the fluid flow, the fluid pressure in the drain line 54 upstream of the shut-off valve 207 becomes excessively higher, i.e. higher than the off-set pressure $P_0$. Then, the pressure relief valve 209 becomes active to open to allow the excessive pressure of the working fluid to flow through the by-pass line 210.

When the engine 200 stops, the pressure unit 16 ceases operation. By stopping the pressure unit 16, the working fluid pressure in the supply line 52 drops and the pilot pressure to be exerted to the shut-off valve 207 via the pilot line 208 drops accordingly. When the pilot line 208 drops below or equal to the set pressure, the shut-off valve 207 is switched into a shut-off position to block fluid communication therethrough. As a result, the fluid pressure in the drain line 54 upstream of the shut-off valve 207 becomes equal to the pressure in the working chamber 26d. Therefore, even when the working fluid leaks through a gap between the spool valve 48 and the inner periphery of the valve bore, it will not affect the fluid pressure in the working chamber 26d.

This is advantageous to maintain the suspension characteristics of the suspension systems irrespective of the engine driving condition.

Figure 5:
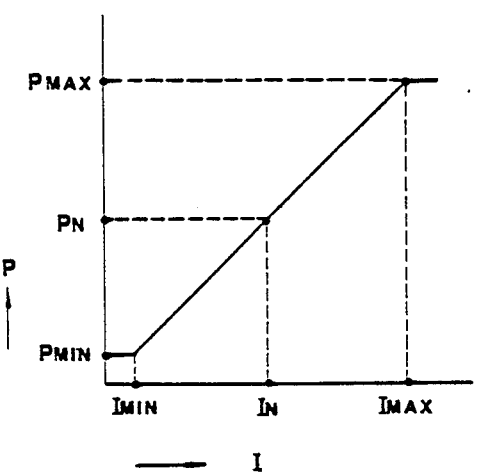
FIG. 5 is a chart showing relationship between an electric current value of a control signal to be output by a control unit and a hydraulic pressure in a pressure chamber of a hydraulic cylinder.

As seen from FIG. 5, the working fluid pressure P in the working chamber 26d of the hydraulic cylinder 26 varies according to variation of the current value I of the control signal applied to the pressure control valve unit 28. As seen from FIG. 5, hydraulic pressure in the working chamber 26d varies between a maximum pressure $P_{max}$ which is the saturation pressure of the pressure source unit 16 and a minimum pressure $P_{min}$ which is set at a magnitude in view of a noise component to be contained in the control signal. As seen from FIG. 5, the maximum hydraulic pressure $P_{max}$ corresponds to the maximum current value $I_{max}$ of the control signal and the minimum hydraulic pressure $P_{min}$ corresponds to the minimum current value $I_{min}$ of the control signal. Furthermore, the hydraulic pressure level as labeled $P_n$ represents neutral pressure at the neutral current $I_n$. As seen, the neutral current value $I_n$ is set at an intermediate value between the maximum current value $I_{max}$ and the minimum current value $I_{min}$.

As shown in FIG. 4, the control unit 22 comprises the microprocessor including an input/output interface, an arithmetic circuit and a memory. The vehicle height sensor 21 is connected to the control unit 22 to input the vehicle height indicative signals as a vehicular attitude change indicative parameter. The control unit 22 is also connected to a pressure sensor 59 which monitors the working fluid pressure in the pressure control line 38 and produces a fluid pressure indicative signal.

The control unit 22 is also connected to a vehicular battery 60 via a power holding circuit 62 and also via an ignition switch 64 which serves as a main switch for the electric equipment of the automotive vehicle and various components of control systems including the control unit 22. The power holding circuit 62 comprises a relay circuit 66 including a relay coil 68 and a movable contact 70, and an OFF-delay timer circuit 72. The OFF-delay timer 72 is further connected to the ignition switch 64 to receive therefrom a switch signal IS indicative of the ignitision switch position. The switch signal IS is also input to the control unit 22 as ignition switch position indicative data.

As seen from FIG. 4, the control unit 22 is connected to the positive terminal of the vehicular battery 60 via the ignition switch 64. The positive terminal of the vehicular battery 60 is further connected to the control unit via a relay switch 74 including the movable contact 70 which is a normally open contact. With this construction, as long as the ignition switch 64 is maintained in the ON position, the power of the vehicular battery 60 is supplied to the control unit 22 via the ignition switch. At this time, the relay coil 68 of the relay circuit 66 is held in a deenergized condition. Therefore, the normally open movable contact is held open to maintain the relay switch 74 in a non-conductive state. By the HIGH level input through the ignition switch 64, the OFF-delay timer 72 is held conductive to establish a connection across the relay coil 68. The relay coil 68 is thus energized to shift the movable contact 70 to close the relay switch. By this electrical connection between the positive terminal of the vehicular battery 60 and the control unit 22, battery power is supplied to the control unit 22.

The OFF-delay timer 72 is maintained conductive for a predetermined period of time after turning the switching signal IS level from HIGH level to LOW level due to turning OFF of the ignition switch. The OFF-delay timer 72 is therefore maintained in a conductive state to maintain the circuit for connecting the positive terminal of the vehicular battery to the relay coil 68 closed. By this, the relay coil 68 is held energized to cause shifting of the normally open movable contact 70 to the closed position. Thus, the movable contact 70 closes the relay switch 74 to establish a connection between the positive terminal of the vehicular battery and the control unit 22. Therefore, power supply for the control unit 22 is maintained for the period set in the OFF-delay time set in the OFF-delay timer.

Figure 6:
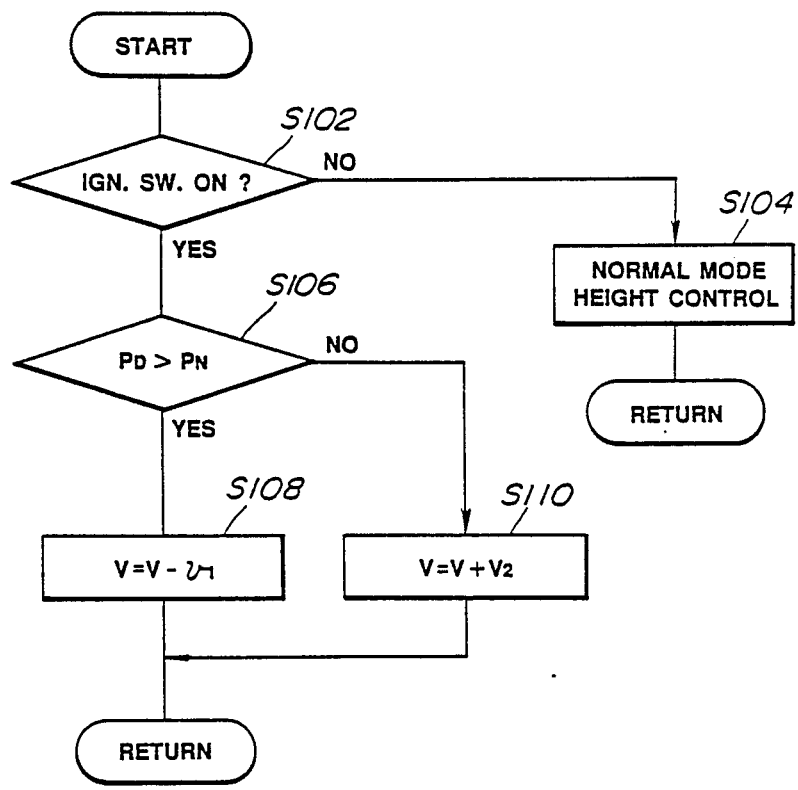
FIG. 6 is a flowchart of a suspension control program for deriving a suspension control signal.

FIG. 6 is a flowchart of a suspension control program executed by the control unit 22. The control operation to be performed by the preferred embodiment of the suspension control system, according to the invention, will be discussed according to the process illustrated in FIG. 6 with reference to the timing chart in FIG. 7.

Immediately after starting execution, the ignition switch position is checked at a step S102. In practice, the ignition switch position is checked by checking the signal level of the switch signal IS. When the switch signal level IS is maintained at the HIGH level and thus the ON position of the ignition switch 64 is detected, normal height control is performed at a step S104.

In the step S104, normal mode suspension control, such as bouncing suppressive control, anti-rolling, anti-pitching control and so forth, is performed on the basis of various control parameters. In the instant embodiment, control for vehicular height regulation is performed based on the vehicle height indicative signal value $H_D$. In the practical control, the vehicle height indicative signal value $H_D$ is compared with a predetermined reference value $D_N$ which is representative of a standard or neutral height position of the vehicular body. A suspension control value V of a control signal is derived on the basis of a difference between the vehicle height indicative signal value $H_D$ and the reference value $D_N$ for adjusting the vehicular height level at the neutral height level. The control signal indicative of the control value V is supplied to the plunger 58 of the pressure control valve 28 for adjusting the fluid pressure in the working chamber 26d. For instance, when the vehicle height indicative signal value $H_D$ is greater than the reference value $D_N$, the control signal for reducing the pressure in the working chamber 26d is output. On the other hand, when the vehicle height indicative signal value $H_D$ is smaller than the reference value $D_N$, the control signal ordering increasing of the fluid pressure in the working chamber 26d is output.

When the ignition switch 64 is turned OFF, the OFF-delay timer 70 is maintained conductive for the given period as set forth above. Therefore, power supply for the control unit is maintained for the OFF-delay period of the OFF-delay timer.

In response to turning OFF of the ignition switch 64, switch signal IS turns into LOW level. The LOW level switch signal IS is detected at the step S102. Then, the operation mode of the control system is switched into the power OFF transition mode operation. The power OFF transition mode operation is performed in the OFF-delay period of the OFF-delay timer 70. In the power OFF transition mode operation, the fluid pressure indicative signal $P_D$ from the fluid pressure sensor 59 is read out and compared with the nuetral pressure $P_N$ at a step S106.

When the fluid pressure indicative signal value $P_D$ is greater than the neutral pressure indicative value $P_N$ as checked at the step S106, a pressure adjusting value $v_1$ is derived at a step S108. The pressure adjusting value $v_1$ is variable depending upon the difference of the fluid pressure indicative signal value $P_D$ and the neutral pressure indicative value $P_N$ and indicative of the magnitude of the fluid pressure to be decreased in each execution cycle so that the pressure in the working chamber 26d can be adjusted to the neutral pressure within the OFF-delay period. At the step S108, the control signal value V is modified by subtracting the pressure adjusting value $v_1$ to derive the reduced value of the pressure control signal value. The control signal with the control signal value modified in the step S108 is then output to the plunger 58 of the pressure control valve 28 at the step S108.

On the other hand, when the fluid pressure indicative sensor signal $P_D$ is smaller than the neutral pressure indicative value $P_N$ as checked at the step S106, a pressure adjusting value $v_2$ is derived at a step S110. The pressure adjusting value $v_2$ is variable depending upon the difference of the fluid pressure indicative signal value $P_D$ and the neutral pressure indicative value $P_N$ and indicative of the magnitude of the fluid pressure to be increased in each execution cycle so that the pressure in the working chamber 26d can be adjusted to the neutral pressure within the OFF-delay period. At the step S110, the control signal value V is modified by adding the pressure adjusting value $v_2$ to derive the reduced value of the pressure control signal value. The control signal with the control signal value modified in the step S110 is then output to the plunger 58 of the pressure control valve 28.

Therefore, when the process is in the power OFF transision mode control operation, the fluid pressure in the working chamber 26d is gradually adjusted toward the neutral pressure $P_N$.

Figure 7:
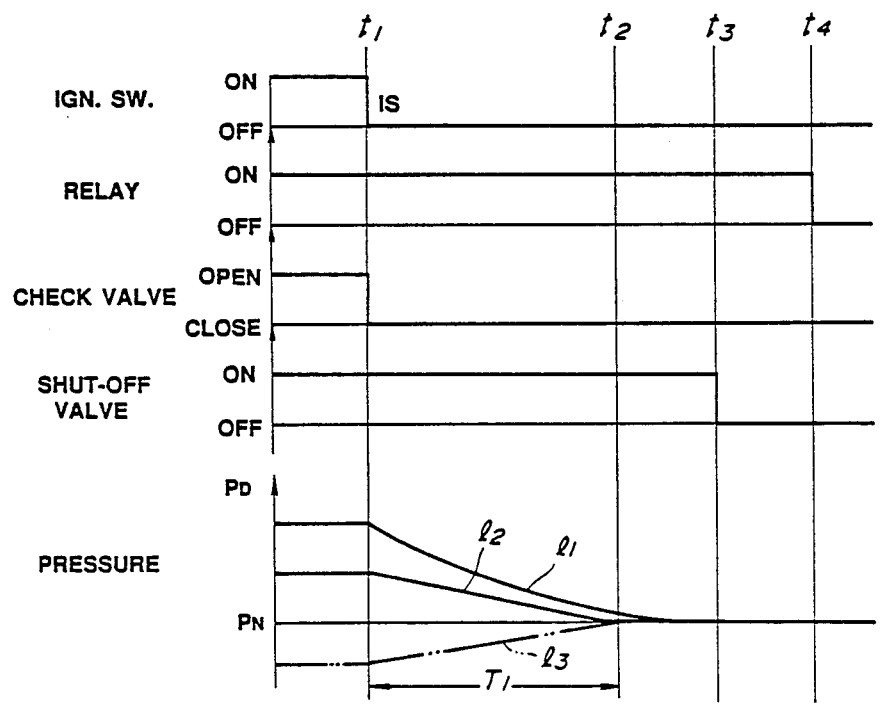
FIG. 7 is a chart showing the operation of the shown embodiment of the suspension control system.

In the example of FIG. 7, after turning OFF the ignition switch 64 at a time $t_1$, the OFF-delay timer 70 is maintained in a conductive state for the OFF-delay period which ends at a time $t_4$. During this period, the fluid pressure $P_D$ which was held higher than the neutral pressure $P_N$ is gradually lowered to the neutral pressure through the power OFF transition mode control operation. In the example shown, the fluid pressure reaches the neutral pressure $P_N$ at a time $t_2$ as shown by line $l_2$. It should be noted that when the fluid pressure $P_D$ is lower than the neutral pressure, the fluid pressure is gradually increased toward the neutral pressure through the process in the steps S106 and S112, as shown by chain-dot line $l_3$. Then, the pressure in the supply line 52 of the hydraulic circuit becomes the neutral pressure. By this, the pressure in the pressure accumulator 203 is drained through the pilot line 42a, the pilot chamber P of the pressure control valve 28 and the fluid path 42t is gradually reduced toward the neutral pressure. The speed of decrease of the fluid pressure in the pressure accumulator 203 is lower than that in the working chamber 26d because of flow resistance in the pressure control valve. As long as the pressure in the drain path 54 is held higher than the pilot pressure introduced through the pilot line 208, which pilot pressure is the neutral pressure at this time, the shut-off valve is held open. At a time $t_3$, the pressure in the pressure accumulator 203 reaches the neutral pressure which is equal to the pilot pressure. Then, the shut-off valve 207 is turned into the shut-off position to block fluid communication.

After expiration of the OFF-delay period, the OFF-delay timer 70 becomes non-conductive to shut-off power supply for the relay coil 68. The relay coil 68 is thus de-energized to open the relay switch 74. As a result, power supply for the control unit 22 is terminated. Therefore, the poppet valve 56 becomes free to move. However, since the hydraulic circuit between the one-way check valve 204 and the shut-off valve 207 is maintained at neutral pressure throughout, no vehicle height change may occur in response to termination of the control by the control unit 22.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the shown embodiment is applied for a suspension control system which employs a pressure control valve, the invention is also applicable for a suspension control system which employs a flow control valve for controlling the flow rate of working fluid. Furthermore, though the embodiment shown employs a pressure sensor for monitoring the fluid pressure in the pressure control line which monitors the pressure in the working chamber, it may possible to utilize the control signal value as a pressure indicative data because the pressure in the working chamber is controlled to the pressure represented by the control signal.

What is claimed is:

1. A control system for controlling suspension characteristics in an automotive suspension system, comprising:
    a cylinder disposed between a vehicle body and a suspension member which rotatably supports a road wheel, said cylinder defining a variable pressure working chamber filled with a pressure medium for generating a damping force resisting against relative displacement between said vehicle body and said suspension member;
    a pressure source circuit means connected to said working chamber for supplying pressure medium and including a pressure source feeding pressurized pressure medium through said pressure source circuit means;
    a pressure control valve disposed between said pressure source and said working chamber and variable of valve position between a first mode for increasing pressure of said pressure medium within said working chamber, a second mode for decreasing pressure in said pressure medium within said working chamber, and a third mode for maintaining said pressure in said pressure medium within said working chamber constant;
    a sensor means for monitoring vehicle body attitude change for producing a vehicle body attitude change indicative sensor signal;
    a controller means for deriving a control signal on the basis of said vehicle body attitude change indicative signal for operating said pressure control valve to one of said first, second and third mode to adjust the pressure of said pressure medium in said working chamber for suppressing attitude change of the vehicle body;
    an electric power supply circuit connecting said controller means to an electric power source, said electric power supply circuit including a power main switch for controlling power supply for said controller means; and
    means, responsive to switching of said power main switch form a power supply position to a power shut-off position, for maintaining power supply for said controller means for a given period of time.

2. A control system as set forth in claim 1, wherein said power main switch is an ignition switch.

3. A control system as set forth in claim 1, wherein said pressure source circuit means includes a check valve means which maintains the pressure of said pressure medium in said working chamber at a given pressure.

4. A control system as set forth in claim 1, wherein said controller means is variable of operation mode between a normal mode for deriving said control signal on the basis of said vehicular attitude indicative signal value for suppressing vehicular attitude change and a power OFF transition mode, in which the pressure of said pressure medium in said working chamber is adjusted toward a preset pressure.

5. A control system as set forth in claim 4, wherein said controller means derives said control signal in said power OFF transisition mode for gradually adjusting the pressure of said pressure medium in said working chamber toward a preset pressure.

6. A control system as set forth in claim 5, wherein said controller means derives said control signal in said power OFF transisition mode for adjusting the pressure of said pressure medium in said working chamber in stepwise fashion toward said said preset pressure.

7. A control system as set forth in claim 6, wherein said hydralic circuit includes a check valve means which maintains the pressure of said pressure medium in said working chamber at said preset pressure while said power supply for said controlling means is held OFF.

8. A control system for controlling suspension characteristics in an automotive suspension system, comprising:
    a cylinder disposed between a vehicle body and a suspension member which rotatably supports a road wheel, said cylinder defining a variable pressure working chamber filled with a pressure medium for generating a damping force resisting against relative displacement between said vehicle body and said suspension member;
    a pressure source circuit means connected to said working chamber via a control line for supplying pressure medium and including a pressure source feeding pressurized pressure medium through said pressure source circuit means;
    a pressure control valve connected to said pressure source via a supply line and a drain line and to said working chamber via said control line and variable of valve position between a first mode for increasing pressure of said pressure medium within said working chamber, a second mode for decreasing pressure in said pressure medium within said working chamber, and a third mode for maintaining said pressure in said pressure medium within said working chamber constant;
    first and second check valve means respectively provided in said supply and drain lines, said first check valve means allowing flow of pressure medium from said pressure source to said pressure control valve and said second check valve means allowing flow of said pressure medium from said pressure control valve to said pressure source, and said second check valve being responsive to a pressure of pressure medium in said drain line equal to a predetermined pressure for blocking fluid communication therethrough;

a sensor means for monitoring vehicle body attitude change for producing a vehicle body attitude change indicative sensor signal;

a controller means for deriving a control signal on the basis of said vehicle body attitude change indicative signal for operating said pressure control valve to one of said first, second and third mode to adjust the pressure of said pressure medium in said working chamber for suppressing attitude change of the vehicle body;

an electric power supply circuit connecting said controller means to an electric power source, said electric power supply circuit including a power main switch for controlling power supply for said controller means; and an electric power supply circuit connecting said controller means to an electric power source, said electric power supply circuit including a power main switch for controlling power supply for said controller means; and means, responsive to switching of said power main switch from a power supply position to a power shut-off position, for maintaining power supply for said controller means for a given period of time.

9. A control system as set forth in claim 8, wherein said power main switch is an ignition switch.

10. A control system as set forth in claim 8, wherein said controller means is variable of operation mode between a normal mode for deriving said control signal on the basis of said vehicular attitude indicative signal value for suppressing vehicular attitude change and a power OFF transition mode, in which pressure of said pressure medium in said working chamber is adjusted toward a preset pressure.

11. A control system as set forth in claim 10, wherein said controller means derives said control signal in said power OFF transisition mode for gradually adjusting the pressure of said pressure medium in said working chamber toward a preset pressure.

12. A control system as set forth in claim 11, wherein said controller means derives said control signal in said power OFF transisition mode for adjusting the pressure of said pressure medium in said working chamber in stepwise fashion toward said said preset pressure.

13. A control system for controlling suspension characteristics in an automotive suspension system, comprising:

a cylinder disposed between a vehicle body and a suspension member which rotatably supports a road wheel, said cylinder defining a variable pressure working chamber filled with a pressure medium for generating a damping force resisting against relative displacement between said vehicle body and said suspension member;

a pressure source circuit means connected to said working chamber for supplying pressure medium and including a pressure source feeding pressurized pressure medium through said pressure source circuit means;

a pressure control valve disposed between said pressure source and said working chamber for varying fluid pressure in said fluid pressure in said working chamber between a predetermined maximum pressure and a predetermined minimum pressure across a predetermined neutral pressure and variable of valve position between a first mode for increasing pressure in said pressure medium within said working chamber, a second mode for decreasing pressure in said pressure medium within said working chamber and a third mode for maintaining said pressure in said pressure medium within said working chamber constant;

a sensor means for monitoring vehicle body attitude change for producing a vehicle body attitude change indicative sensor signal;

a controller means for deriving a control signal on the basis for said vehicle body attitude change indicative signal for operating said pressure control valve to one of said first, second and third mode to adjust the pressure of said pressure medium in said working chamber for suppressing attitude change of the vehicle body;

an electric power supply circuit connecting said controller means to an electric power source, said electric power supply circuit including a power main switch for controlling power supply for said controller means; and means, responsive to switching of said power main switch form a power supply position to a power shut-off position, for maintaining power supply for said controller means for a given period of time for adjusting fluid pressure toward said neutral pressure.

14. A control system for controlling suspension characteristics in an automotive suspension system, comprising:

a cylinder disposed between a vehicle body and a suspension member which rotatably supports a road wheel, said cylinder defining a variable pressure working chamber filled with a pressure medium for generating a damping force resisting against relative displacement between said vehicle body and said suspension member;

a pressure source circuit means connected to said working chamber for supplying pressure medium and including a pressure source feeding pressurized pressure medium through said pressure source circuit means;

a pressure control valve disposed between said pressure source and said working chamber for varying fluid pressure in said fluid pressure in said working chamber between a predetermined maximum pressure and a predetermined minimum pressure across a predetermined neutral pressure and a variable of valve position between a first mode for increasing pressure of said pressure medium within said working chamber, a second mode for decreasing pressure in said pressure medium within said working chamber, and a third mode for maintaining said pressure in said pressure medium within said working chamber constant;

a sensor means for monitoring vehicle body attitude change for producing a vehicle body attitude change indicative sensor signal;

a controller means for deriving a control signal on the basis of said vehicle body attitude change indicative signal for operating said pressure control valve to one of said first, second and third mode to adjust the pressure of said pressure medium in said working chamber for suppressing attitude change of the vehicle body;

an electric power supply circuit connecting said controller means to an electric power source, said electric power supply circuit including a power main switch for controlling power supply for said controller means; and means, responsive to switching of said power main switch from a power supply position to a power shut-off position, for maintaining power supply for said controller means for a given period of time for adjusting fluid pressure toward said neutral pressure by periodically varying fluid pressure in said working chamber toward said neutral pressure at a given rate which is derived so that the fluid pressure in the working chamber becomes equal to said neutral pressure within said predetermined period of time.

15. A control system for controlling suspension characteristics in an automotive suspension system, comprising:

a cylinder disposed between a vehicle body and a suspension member which rotatably supports a road wheel, said cylinder defining a variable pressure working chamber filled with a pressure medium for generating a damping force resisting against relative displacement between said vehicle body and said suspension member;

a pressure source circuit means connected to said working chamber for supplying pressure medium and including a pressure source feeding pressurized pressure medium through said pressure source circuit means;

a pressure control valve disposed between said pressure source and said working chamber for varying chamber between a predetermined maximum pressure and a predetermined minimum pressure across a predetermined neutral pressure and variable of valve position between a first mode for increasing pressure of said pressure medium within said working chamber, a second mode for decreasing pressure in said pressure medium within said working chamber, and a third mode for maintaining said pressure in said pressure medium within said working chamber constant;

a sensor means for monitoring vehicle body attitude change for producing a vehicle body attitude change indicative sensor signal;

a controller means for deriving a control signal on the basis of said vehicle body attitude change indicative signal for operating said pressure control valve to one of said first, second and third mode to adjust the pressure of said pressure medium in said working chamber for suppressing attitude change of the vehicle body;

an electric power supply circuit connecting said controller means to an electric power source, said electric power supply circuit including a power main switch for controlling power supply for said controller means; and means, responsive to switching of said power main switch from a power supply position to a power shut-off position, for maintaining power supply for said controller means for a given period of time for adjusting fluid pressure toward said neutral pressure by adjusting fluid pressure in said working chamber in a stepwise fashion toward said neutral pressure at a given rate which is derived on the basis of a pressure difference between the instantaneous fluid pressure on switching OFF of said power main switch and said neutral pressure so that the fluid pressure in said working chamber becomes equal to said neutral pressure within said predetermined period of time.

* * * * *